(12) United States Patent
Kashyap et al.

(10) Patent No.: US 9,397,939 B2
(45) Date of Patent: Jul. 19, 2016

(54) HYBRID APPROACH FOR PERFORMANCE ENHANCING PROXIES

(71) Applicant: INTERNATIONAL BUSINESS MACHINES CORPORATION, Armonk, NY (US)

(72) Inventors: Vivek Kashyap, Beaverton, OR (US); Michael J. Kravetz, Beaverton, OR (US); Xiuling Ma, Portland, OR (US); Erich M. Nahum, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 14/313,354

(22) Filed: Jun. 24, 2014

(65) Prior Publication Data
US 2015/0372908 A1    Dec. 24, 2015

(51) Int. Cl.
| | |
|---|---|
| *H04L 12/741* | (2013.01) |
| *H04L 12/26* | (2006.01) |
| *H04L 29/06* | (2006.01) |
| *H04L 29/08* | (2006.01) |

(52) U.S. Cl.
CPC ............ *H04L 45/74* (2013.01); *H04L 43/0829* (2013.01); *H04L 67/28* (2013.01); *H04L 69/161* (2013.01); *H04L 63/1466* (2013.01)

(58) Field of Classification Search
CPC ..................... H04L 29/0653; H04L 29/06095; H04L 49/3009; H04L 49/309; H04L 45/74
See application file for complete search history.

(56) References Cited

U.S. PATENT DOCUMENTS

| | | | |
|---|---|---|---|
| 5,519,699 A | 5/1996 | Ohsawa | |
| 6,266,335 B1* | 7/2001 | Bhaskaran | H04L 29/06 370/389 |
| 6,587,435 B1 | 7/2003 | Miyake et al. | |
| 8,654,659 B2* | 2/2014 | Gandhewar | H04L 63/0227 370/252 |
| 2010/0138551 A1* | 6/2010 | Degaonkar | H04L 29/12066 709/228 |
| 2011/0149755 A1* | 6/2011 | Gandhewar | H04L 63/0227 370/252 |
| 2014/0189093 A1 | 7/2014 | du Toit et al. | |
| 2014/0359044 A1* | 12/2014 | Davis | H04L 45/60 709/213 |

OTHER PUBLICATIONS

Bakre, A., et al. "I-TCP: Indirect TCP for Mobile Hosts" Proceedings of the 15th International Conference on Distributed Computing Systems. May 1995. pp. 136-143.
(Continued)

*Primary Examiner* — Hassan Phillips
*Assistant Examiner* — Prenell Jones
(74) *Attorney, Agent, or Firm* — Tutunjian & Bitetto, P.C.; Jennifer R. Davis

(57) ABSTRACT

There are provided a transparent performance enhancing proxy, a method for operating a transparent performance enhancing proxy between a source device and a destination device, and corresponding computer program product. The method includes preserving, without translation, packet header information of a header for a packet received from the source device to be forwarded to the destination device. The method further includes during a transmission control protocol connection setup phase for the packet, preserving transmission control protocol connection semantics. The method also includes during a transmission control protocol data transfer phase for the packet, running a transmission control protocol by masquerading as the source device to the destination device and masquerading as the destination device to the source device to transmit the packet to the destination device with the preserved packet header information.

17 Claims, 5 Drawing Sheets

(56) References Cited

OTHER PUBLICATIONS

Balakrishnan, H., et al. "Improving TCP/IP Performance over Wireless Networks" Proceedings of the First Annual International Conference on Mobile Computing and Networking. Nov. 1995. pp. 2-11.

Balakrishnan, H., et al. "A Comparison of Mechanisms for Improving TCP Performance over Wireless Links" IEEE/ACM Transactions on Networking, vol. 5, No. 6, Dec. 1997. pp. 756-769.

Border, J., et al. "Performance Enhancing Proxies Intended to Mitigate Link-Related Degradations" IETF RFC 3135. Mar. 2001. pp. 1-45.

Caytiles, R., et al. "An Enhanced Packet Buffering Transmission (EPBT) Architecture Design for Performance Enhancing Proxies (PEPs)" International Journal of Software Engineering and Its Applications. vol. 6, No. 4, Oct. 2012. pp. 155-164.

International Search Report and Written Opinion dated Sep. 15, 2015 issued in International Application No. PCT/IB2015/054660.

\* cited by examiner

HYBRID APPROACH FOR PERFORMANCE ENHANCING PROXIES

BACKGROUND

1. Technical Field

The present invention relates generally to information processing and, in particular, to a hybrid approach for performance enhancing proxies.

2. Description of the Related Art

A fundamental problem in using Transmission Control Protocol/Internet Protocol (TCP/IP) over wireless networks is TCP's default behavior in interpreting packet losses as a sign of network congestion. While this assumption is useful in wired networks, where packet losses are mainly caused by buffering limits in routers, it causes problems in wireless networks. This is because in wireless networks, packet losses can occur due to issues such as fading, attenuation, and collisions, problems unique to using the air as the transmission channel. These packet losses can unnecessarily restrict performance, leaving the wireless channel under-utilized.

There have thus been approaches to mitigate this problem by decoupling packet loss from congestion control, through the following two approaches:
(a) modifying the end-host TCP protocol stack; or
(b) inserting a middlebox, known as a performance-enhancing proxy, close to the wireless link.

The first approach is difficult to deploy since it relies on upgrading all the clients and all the servers that utilize the wireless link, typically an extremely difficult process due to the wide variety of mobile devices and server operating systems.

The second approach is easier to deploy, since it can be done incrementally, as well as transparently to the client and server. However, the second approach, as implemented in the prior art, suffers from many deficiencies including, but not limited to, changing the semantics of the TCP connection in undesirable manners that can cause incorrect behavior by the sender.

SUMMARY

According to an aspect of the present principles, there is provided a method for operating a transparent performance enhancing proxy between a source device and a destination device. The method includes preserving, without translation, packet header information of a header for a packet received from the source device to be forwarded to the destination device. The method further includes during a transmission control protocol connection setup phase for the packet, preserving transmission control protocol connection semantics. The method also includes during a transmission control protocol data transfer phase for the packet, running a transmission control protocol by masquerading as the source device to the destination device and masquerading as the destination device to the source device to transmit the packet to the destination device with the preserved packet header information.

According to another aspect of the present principles, there is provided a computer program product for operating a transparent performance enhancing proxy. The computer program product includes a computer readable storage medium having program instructions embodied therewith. The program instructions are executable by a processor included in the transparent performance enhancing proxy to cause the transparent performance enhancing proxy to preserve, without translation, packet header information of a header for a packet received from the source device to be forwarded to the destination device. Moreover, the program instructions executable by the processor included in the transparent performance enhancing proxy cause the transparent performance enhancing proxy to, during a transmission control protocol connection setup phase for the packet, preserve transmission control protocol connection semantics. Further, the program instructions executable by the processor included in the transparent performance enhancing proxy cause the transparent performance enhancing proxy to, during a transmission control protocol data transfer phase for the packet, running a transmission control protocol by masquerading as the source device to the destination device and masquerading as the destination device to the source device to transmit the packet to the destination device with the preserved packet header information.

According to yet another aspect of the present principles, there is provided a transparent performance enhancing proxy for disposing between a source device and a destination device. The proxy includes a processor for preserving, without translation, packet header information of a header for a packet received from the source device to be forwarded to the destination device. The proxy further includes a memory for storing a copy of the packet. During a transmission control protocol connection setup phase for the packet, the processor preserves transmission control protocol connection semantics. Moreover, during a transmission control protocol data transfer phase for the packet, the processor runs a transmission control protocol by masquerading as the source device to the destination device and masquerading as the destination device to the source device to transmit the packet to the destination device with the preserved packet header information.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to a hybrid approach for performance enhancing proxies. The performance enhancing proxies described herein are intended to be located in between a sending device and a receiving device. As used herein, the term "in between" refers to any of an in-band configuration (FIG. 1) of a performance enhancing proxy (PEP) and a side-band configuration (FIG. 2) of a PEP.

We note that the following terms are used interchangeably herein: sending device; sender; source; and server. We further note that the following terms are also used interchangeably herein: receiving device; receiver; destination; client device; and client. The interchangeability of such terms is readily appreciated by one of ordinary skill in the art.

Figure 1:
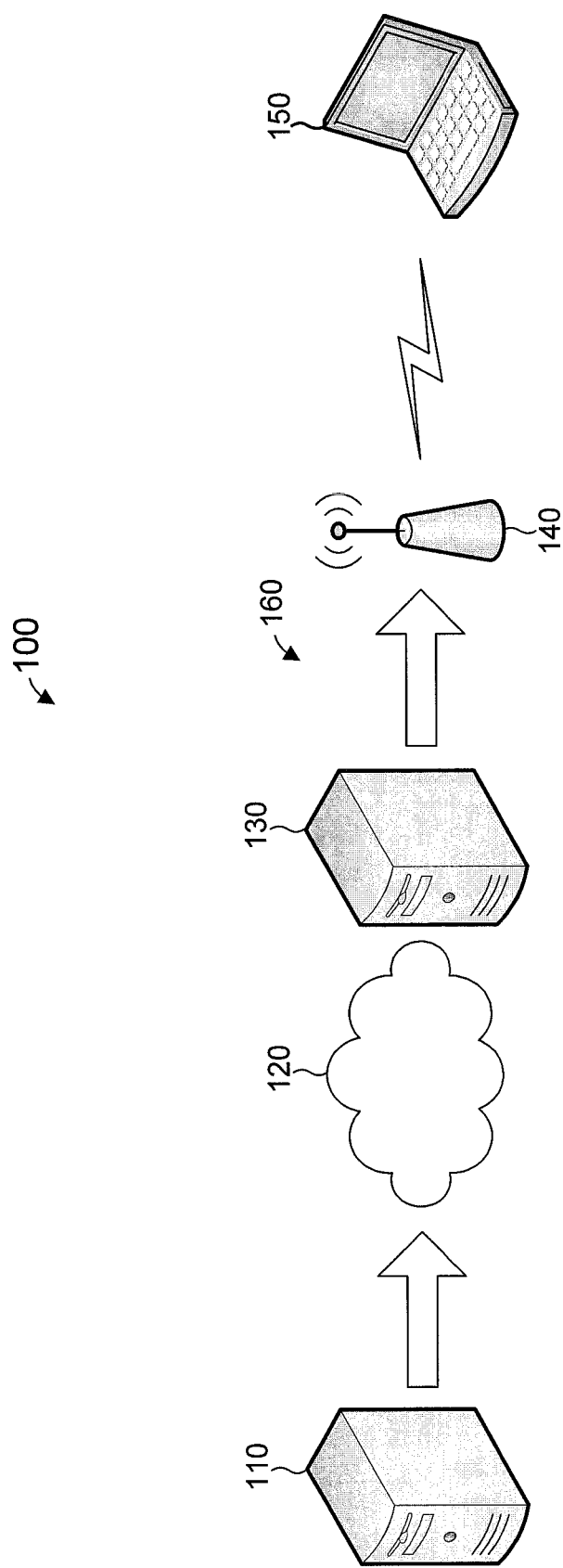
FIG. 1 shows an exemplary environment 100 to which the present principles can be applied, in accordance with an embodiment of the present principles.

FIG. 1 shows an exemplary environment 100 to which the present principles can be applied, in accordance with an embodiment of the present principles. The environment 100 includes a server 110, a Wide Area Network (WAN) 120, a performance enhancing proxy (PEP) 130, an access point 140, and a client device 150 (hereinafter "client" in short). The PEP 130 is connected to the access point 140 over a Local Area Network (LAN) 160.

In the environment 100, the PEP 130 is connected in an in-band configuration. Accordingly, all traffic flows through the PEP 130. Hence, the PEP 130 is similar to a router in that the PEP 130 sees all packets.

Figure 2:
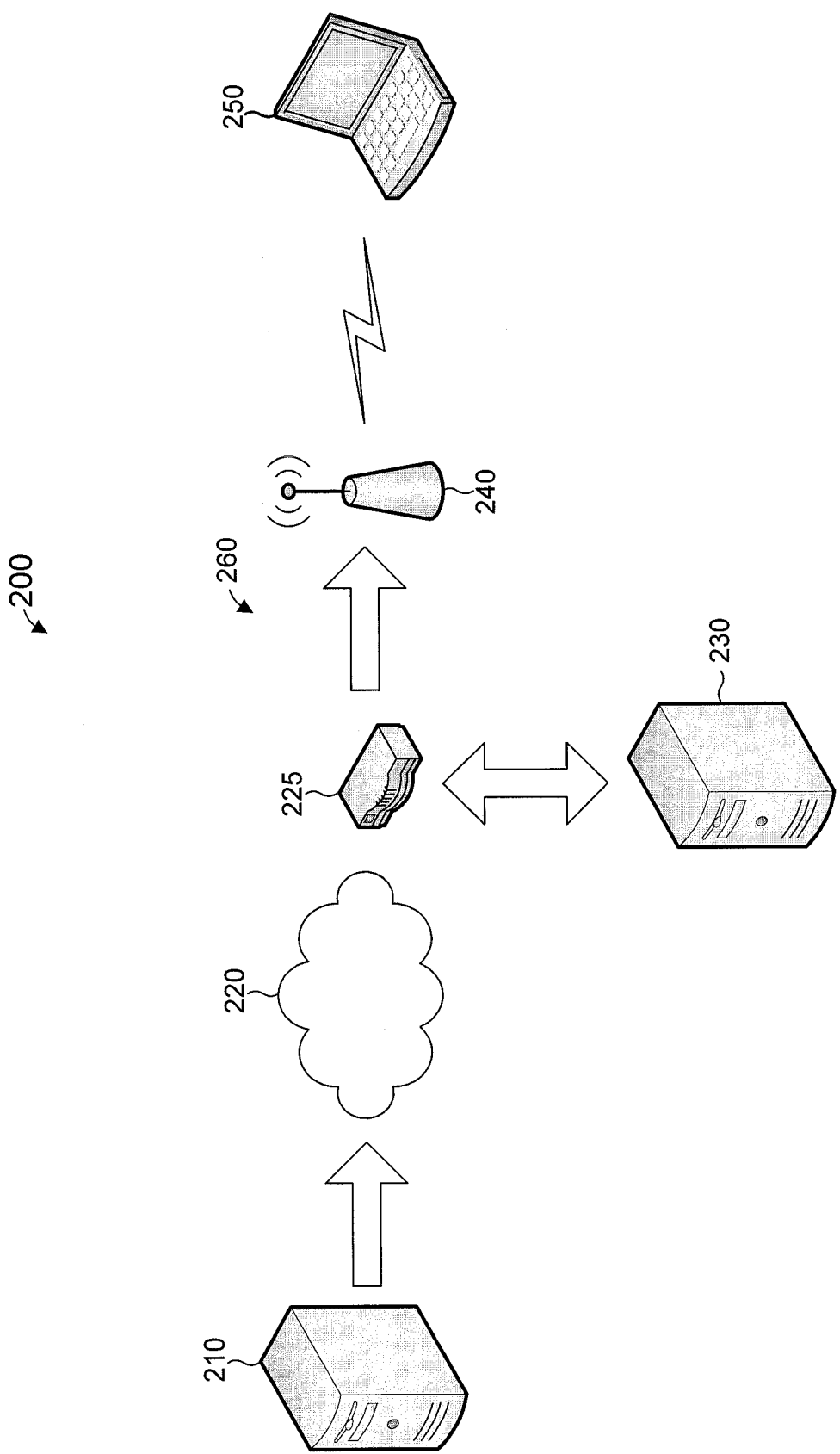
FIG. 2 shows another exemplary environment 200 to which the present principles can be applied, in accordance with an embodiment of the present principles.

FIG. 2 shows another exemplary environment 200 to which the present principles can be applied, in accordance with an embodiment of the present principles. The environment 200 includes a server 210, a Wide Area Network (WAN) 220, a router 225, a performance enhancing proxy (PEP) 230, an access point 240, and a client device 250 (hereinafter "client" in short). The PEP 230 is connected to the access point 240 over a Local Area Network (LAN) 260. Of course, the present principles are not limited to the configuration shown in FIG. 2 or 3. For example, regarding FIG. 2, in another embodiment, the PEP 230 could be connected to a Wide Area Network (WAN) in place of the LAN 260. In yet another embodiment, the PEP 230 can be incorporated within the access point 240. The preceding configurations described herein are merely illustrative and, thus, one of ordinary skill in the art will consider these and other configurations in which PEP 230 (as well as PEP 330 described below with respect to FIG. 3) can be used given the teachings of the present principles provided herein, while maintaining the spirit of the present principles.

In the environment 200, the PEP 230 is connected in a side-band configuration. The router 225 redirects packets to the PEP 230. The redirection by the router 225 can be performed, for example, but not limited to, MAC-layer re-writing or tunneling. Accordingly, the PEP 230 only sees the traffic redirected to it by the router 225.

Figure 3:
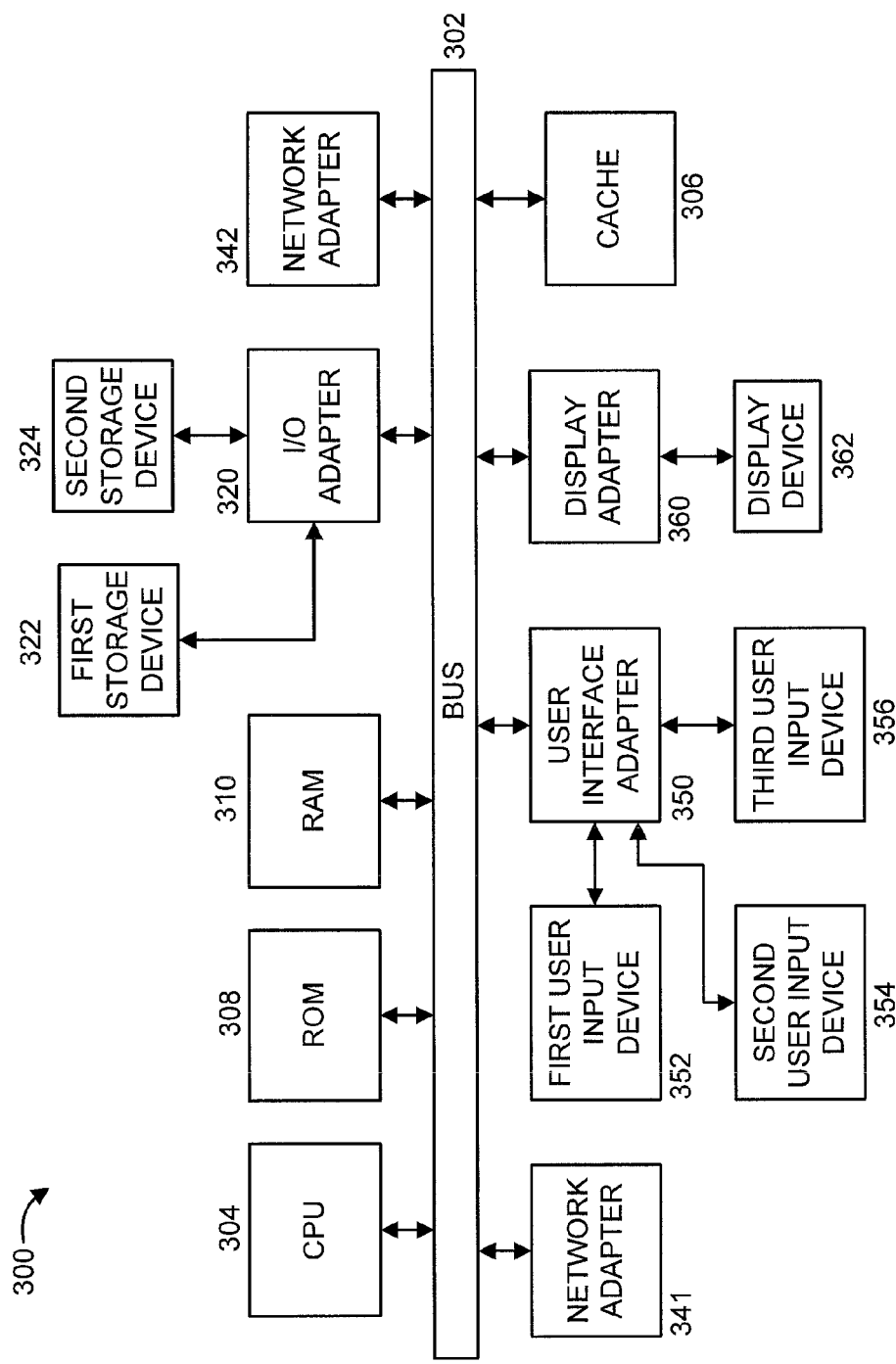
FIG. 3 further shows the transparent performance enhancing proxy (PEP) 130 of FIG. 1 and the PEP 230 of FIG. 2, in accordance with an embodiment of the present principles.

FIG. 3 further shows the transparent performance enhancing proxy (PEP) 130 of FIG. 1 and the PEP 230 of FIG. 2, in accordance with an embodiment of the present principles. The PEP 130/230 includes at least one processor (CPU) 304 operatively coupled to other components via a system bus 302. A cache 306, a Read Only Memory (ROM) 308, a Random Access Memory (RAM) 310, an input/output (I/O) adapter 320, two network adapter 341 and 342, a user interface adapter 350, and a display adapter 360, are operatively coupled to the system bus 302.

A first storage device 322 and a second storage device 324 are operatively coupled to system bus 302 by the I/O adapter 320. The storage devices 322 and 324 can be any of a disk storage device (e.g., a magnetic or optical disk storage device), a solid state magnetic device, and so forth. The storage devices 322 and 324 can be the same type of storage device or different types of storage devices.

The network adapters 341 and 342 can be any of a wired network adapter and/or a wireless network adapter. That is, the network adapters 341 and 342 can be of the same type (both wired or both wireless) or different types. In an embodiment, the network adapter 341 is a wireless network adapter and the network adapter 342 is a wired network adapter. Of course, any number of network adapters can be used in accordance with the teachings of the present principles, depending upon the implementation.

A first user input device 352, a second user input device 354, and a third user input device 356 are operatively coupled to system bus 302 by user interface adapter 350. The user input devices 352, 354, and 356 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 352, 354, and 356 can be the same type of user input device or different types of user input devices. The user input devices 352, 354, and 356 are used to input and output information to and from PEP 130/230.

A display device 362 is operatively coupled to system bus 302 by display adapter 360.

In an embodiment, the PEP 130/230 can be a server. The PEP 130/230 can be implemented as, for example, but is not limited to, a WAN accelerator, a web cache, and a network optimizer appliance/WIFI Accelerator (NOA/WAX).

Of course, the PEP 130/230 may also include other elements (not shown), as readily contemplated by one of skill in the art, as well as omit certain elements. For example, various other input devices and/or output devices can be included in PEP 130/230, depending upon the particular implementation of the same, as readily understood by one of ordinary skill in the art. For example, various types of wireless and/or wired input and/or output devices can be used. Further, in some embodiments, user direct input devices can be omitted, with user inputs provided remotely through one or both of the network adapters 341 and 342. Moreover, additional processors, controllers, memories, and so forth, in various configurations can also be utilized as readily appreciated by one of ordinary skill in the art. These and other variations of PEP 130/230 are readily contemplated by one of ordinary skill in the art given the teachings of the present principles provided herein.

Figure 4:
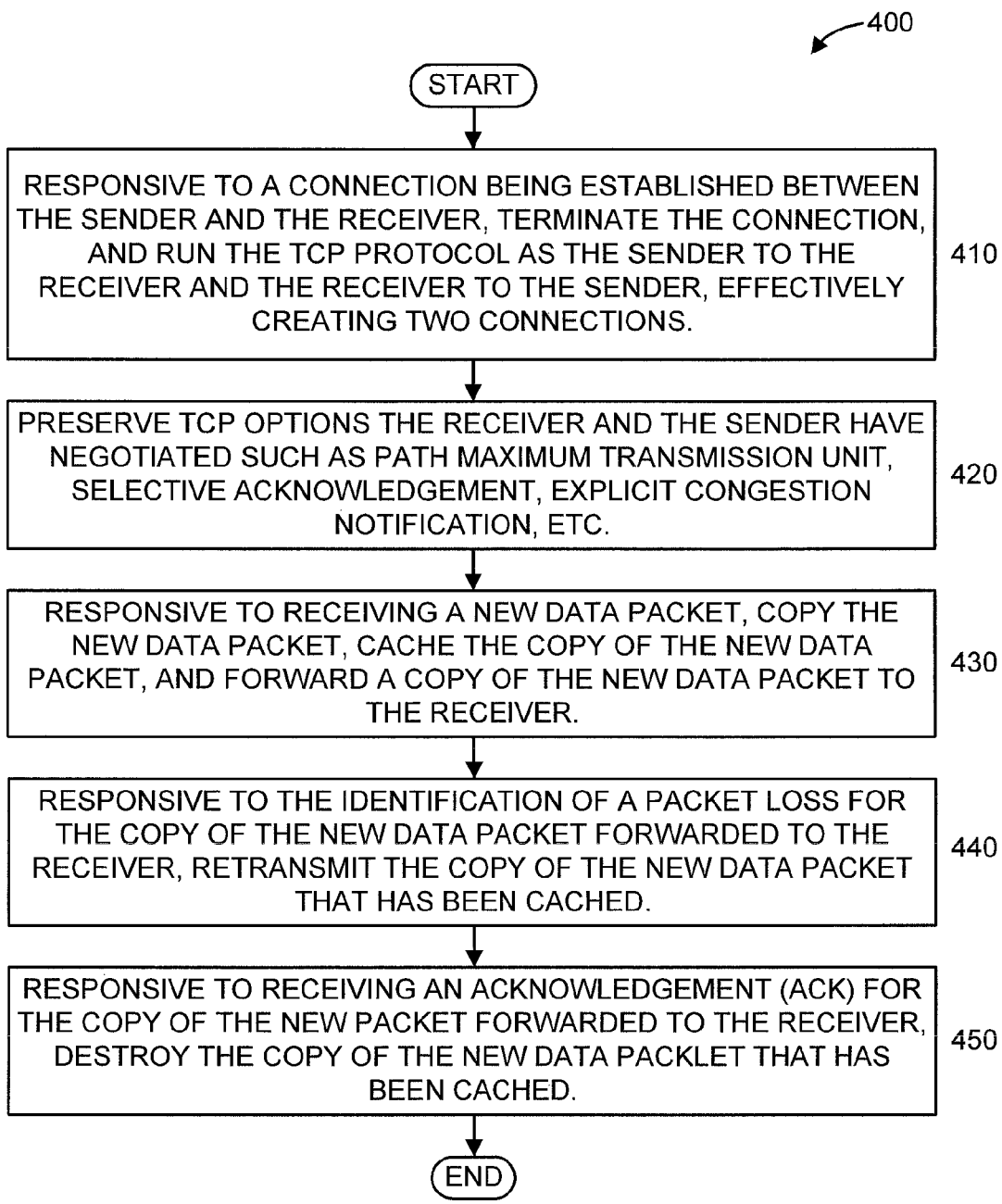
FIG. 4 shows an exemplary method 400 performed by a transparent performance enhancing proxy (PEP), in accordance with an embodiment of the present principles.

FIG. 4 shows an exemplary method 400 performed by a transparent performance enhancing proxy (PEP), in accordance with an embodiment of the present principles. The transparent PEP can be, for example, PEP 130 shown in FIG. 1 or the PEP 230 shown in FIG. 2. The transparent PEP is located in between a sender and a receiver. The sender can be, for example, the server 110 shown in FIG. 1 or the server 220 shown in FIG. 2. The receiver can be, for example, the client 150 shown in FIG. 1 or the client 250 shown in FIG. 2.

At step 410, responsive to a connection being established between the sender and the receiver, terminate the connection, and run the TCP protocol as the sender to the receiver and the receiver to the sender, effectively creating two connections.

At step 420, preserve TCP options the receiver and sender have negotiated such as path Maximum Transmission Unit (MTU), SACK, Explicit Congestion Notification (ECN), and so forth.

At step 430, responsive to receiving a new data packet, copy the new data packet, cache the copy of the new data packet, and forward the copy of the new data packet to the receiver.

At step 440, responsive to the identification of a packet loss for the copy of the new data packet forwarded to the receiver, retransmit the copy of the new data packet that has been cached. The identification of the packet loss can be made, for example, through duplicate ACKs, Selective Acknowledgement (SACK) blocks, retransmission timeout, and so forth.

At step 450, responsive to receiving an Acknowledgment (ACK) for the copy of the new packet forwarded to the receiver, destroy the copy of the new data packet that has been cached.

Regarding step 430, the same is described as involving "destroying" a copy of a packet. The terms "destroying" or "destroy" encompass any of a variety of actions that has the effect of, for example, removing, cancelling, deleting, delisting, or de-referencing a packet, or making the packet unusable or inaccessible. As examples, a packet may be "destroyed" by deallocating memory associated with the packet and giving that memory back to an operating system, or by giving memory back to a memory pool.

A description will now be given regarding TCP sequence numbers, the Synchronize (SYN) flag, and acknowledgements (ACKs). TCP uses the sequence number to identify each byte of data. The sequence number identifies the order of the bytes sent from the source device and the destination device so that the data can be reconstructed in the proper intended order regardless of, e.g., reordering or packet loss during transmission. Also, the sequence number allows the destination device to discard duplicate packets. The initial sequence number (ISN) exchanged between the source device and the destination device is arbitrary (e.g., prevent sequence prediction attacks). If the SYN flag is set (1), then this is the initial sequence number of the actual first data byte, and the acknowledged number in the corresponding ACK is then this sequence number plus 1. If the SYN flag is clear (0), then this is the accumulated sequence number of the first data byte of this segment for the current session. If the ACK flag is set (1), then the value of the ACK field is the next sequence number that the receiver is expected, which serves to acknowledge receipt of all prior bytes if any. The first ACK sent by the source and the destination acknowledge the other's initial sequence number itself but not data.

A description will now be given regarding performance enhancing proxies.

Performance enhancing proxies (PEPs) come in many forms (link level, TCP level, Hypertext Transfer Protocol (HTTP) proxies), but a convenient approach is at the TCP layer, since it benefits all TCP traffic (which is the bulk of the traffic on the Internet).

TCP PEPs fall into two categories: Split-TCP; and Snoop-TCP. Both improve performance over wireless links, albeit in different ways, and have different advantages and disadvantages.

In the case of Split-TCP, the PEP splits the connection from the source to the destination into two connections, either explicitly or implicitly. In explicitly splitting the connection, Split-TCP uses different IP addresses and TCP port numbers. In implicitly splitting the connection, the PEP pretends to be the endpoint (destination) of a connection from a source to the destination in each direction. That is, the PEP masquerades as the source to the destination and as the destination to the source, using the same IP addresses. In either case of Split-TCP, the source and destination do not need to be made aware of the use of the PEP(s) there between.

In the case of Snoop-TCP, the PEP controls the transmissions of the TCP segments in both directions by, e.g., ACK filtering and reconstruction in the existing (non-split) connection. When duplicate TCP ACKs are received, with such condition being associated with a high likelihood of a packet loss, the corresponding lost packet is retransmitted without the source having any knowledge of the packet loss.

The present principles propose Split-Snoop, a hybrid approach to TCP-level performance-enhancing proxies. Split-Snoop is a novel and unobvious combination of features that arrive at a unique design point with the best of the advantages of the two approaches and a minimal set of disadvantages.

A description will now be given regarding Split TCP.

Split TCP terminates the TCP connection at the PEP, either explicitly (using different IP addresses and TCP port numbers), or implicitly (by using the same IP addresses and masquerading as the server to the client and as the client to the server).

Split TCP has the following advantages in that it improves performance in at least 4 ways:
(1) Split TCP allows quicker loss recovery over the wireless link;
(2) Split TCP allows the congestion window of the sender to grow more quickly due to lower roundtrip time;
(3) Split TCP increases the size of the buffer space available to the sender by advertising a larger receive window than the original receiver; and
(4) Split TCP allows improvements in protocol behavior over part of the network by making available certain TCP functionality (e.g., by enabling Selective Acknowledgement (SACK) over the wireless components, or Large Windows over the wired link).

Split TCP has the following disadvantages:
(1) Split TCP changes the semantics of the TCP connection in two important ways:
(a) connection failure error codes are changed (e.g., by converting what would be a no response error to a connection reset error), which may cause incorrect behavior by the sender; and
(b) data acknowledgements are returned to the sender by the PEP, before being acknowledged by the client, leading the sender to believe that the receiver has gotten the information when the receiver has not, again potentially leading to incorrect sender behavior;
(2) Split TCP requires more processing and memory resources than Snoop TCP;
(3) Split TCP is relatively easy to detect since, to an outside viewer, Split TCP modifies TCP packets (e.g., sequence numbers, TCP options, packet checksums, and so forth).

A description will now be given regarding Snoop TCP.

Snoop TCP is an intelligent TCP-aware packet cache that monitors a TCP conversation, determines when a packet has been lost (before the original sender does), and retransmits that packet on behalf of the sender.

Since Snoop TCP is closer to the receiver than the sender is, this allows quicker loss recovery and thus better performance. Snoop TCP does not terminate TCP connections.

Snoop TCP has the following advantages:
(1) Snoop TCP allows quicker loss recovery over the wireless link;
(2) Snoop TCP does not violate any TCP semantics;
(3) Snoop TCP requires fewer resources (CPU and memory/state) than Split TCP; and
(4) Snoop TCP is harder to detect, since Snoop TCP causes fewer changes to the TCP connection behavior.

Snoop TCP has the following disadvantages:
(1) connections will experience longer latencies with snoop as compared to Split TCP; and
(2) Snoop TCP shows lower performance gains compared to Split TCP.

Having described relevant aspects of Split TCP and Snoop TCP, a further description of Split-Snoop will now be given, in accordance with an embodiment of the present principles.

As noted above, the present principles propose Split-Snoop, a hybrid approach to TCP-level performance-enhancing proxies. Advantageously, Split-Snoop provides a unique design point with the best of the advantages of the two approaches and a minimal set of disadvantages.

For example, but certainly not exhaustive, we mention the following. Similar to Snoop TCP, Split-Snoop caches packets and retransmits them on behalf of the sender when necessary. Also similar to Snoop TCP, Split-Snoop preserves connection setup semantics, by not terminating connections until both sides have completed their connection establishment sequences. Additionally similar to Snoop TCP, Split-Snoop acknowledges data sent by the sender before the data has arrived at the receiver.

Accordingly, in an embodiment, Split-Snoop can have the following advantages:
(1) Split-Snoop allows quicker loss recovery over the wireless link;
(2) Split-Snoop allows the congestion window of the sender to grow more quickly due to lower roundtrip times;
(3) Split-Snoop preserves the connection-setup semantics of Snoop TCP (e.g., Split-Snoop does not change the TCP connection failure error codes, nor return data ACKS to the source by the PEP before being acknowledged by the destination, nor terminate the connections until both sides have completed their connection establishment sequences), as Snoop TCP does, but Split TCP does not;
(4) Split-Snoop requires fewer CPU and memory resources than Split TCP;
(5) Split-Snoop is harder to detect than Split TCP. Detecting Split-Snoop requires understanding more complex dynamics;
(6) Split-Snoop provides better interoperability (e.g., opportunities for effectiveness) over Split TCP. For example Split-Snoop disturbs the packet sequence less than Split TCP. Further, Split-Snoop is more robust to unexpected interactions than Split TCP; and
(7) Split-Snoop has equivalent or comparable performance to Split TCP.

In an embodiment, Split-Snoop can have the following disadvantages:
(1) Split-Snoop violates the data transfer semantics of TCP, as Split TCP does, but Snoop TCP does not. The sender TCP stack will think data has been delivered to the client when the data may not have been;
(2) Split-snoop requires more CPU and memory resources than Snoop TCP; and
(3) Split-snoop is easier to detect than Snoop TCP.

Figure 5:
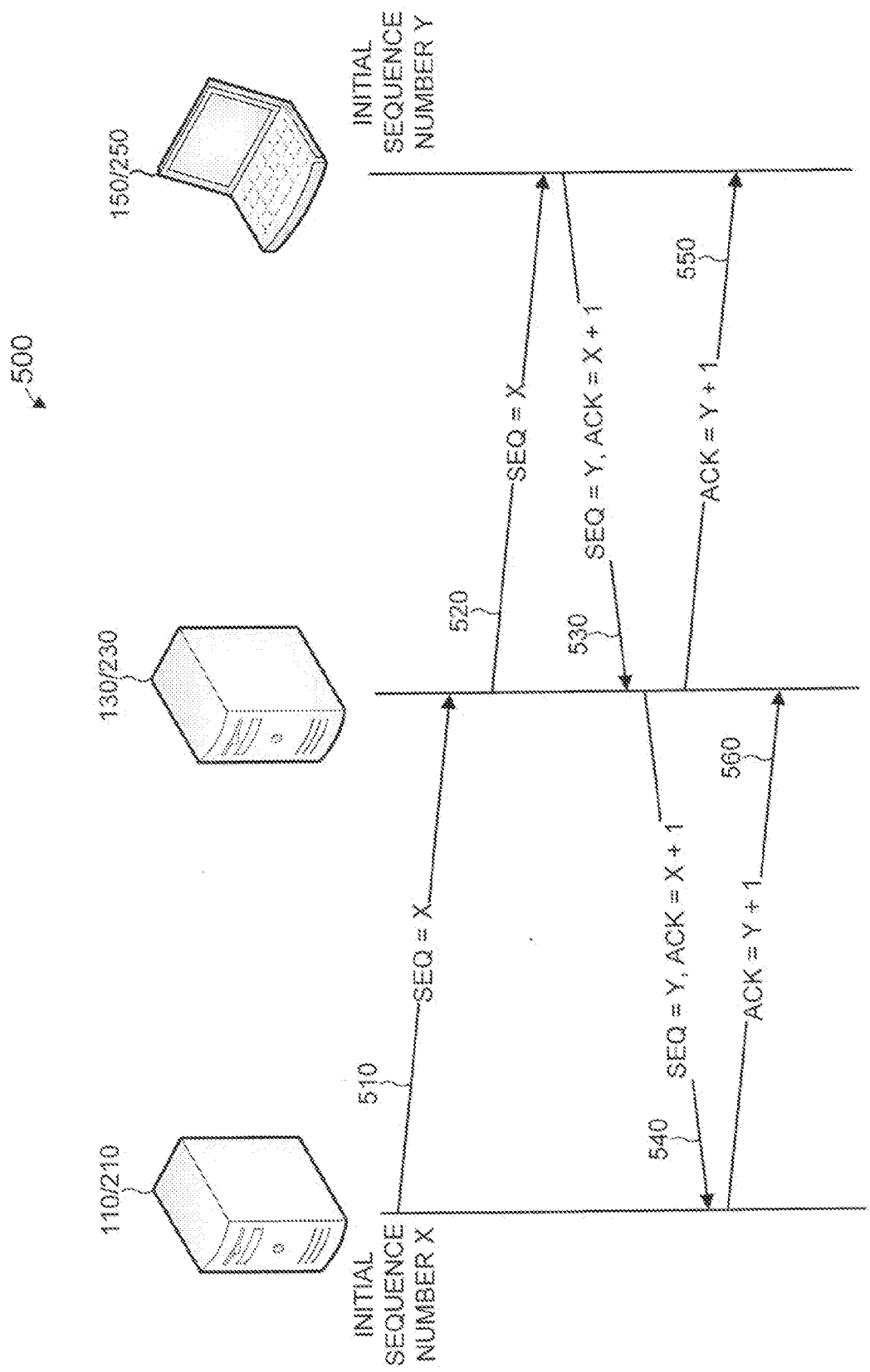
FIG. 5 shows an exemplary hybrid (Split-Snoop) TCP handshake 500, in accordance with an embodiment of the present principles.

FIG. 5 shows an exemplary hybrid (Split-Snoop) TCP handshake 500, in accordance with an embodiment of the present principles.

At step 510, intercept, by the PEP 130/230, a sequence number X sent by the source 110/210.

At step 520, forward, by the PEP 130/230, the sequence number X to the destination 150/250.

At step 530, intercept, by the PEP 130/230, sequence number Y, ACK=X+1 sent by the destination 150/250.

At step 540, forward, by the PEP 130/230, sequence number=y, ACK=X+1 to the source 110/210.

At step 550, send, from the PEP 130/230, ACK=Y+1 to the destination 150/250.

At step 560, intercept, by the PEP 130/230, ACK=Y+1 from the source 110/210.

Split-Snoop thus provides a unique design point that achieves most of the performance benefits of Split TCP with most of the implementation and semantic benefits of Snoop TCP.

Thus, the hybrid approach embodied in Split-Snoop advantageously aggressively preserves all packet headers. Split-Snoop uses the same header information to avoid detection. Hence, no translation of header information is necessary. In an embodiment involving transmission control protocol (TCP), the packet header information includes, for example, but is not limited to, the following: at least one TCP port number (e.g., a source port number and/or a destination port number); a TCP sequence number; TCP header options (e.g., the information in one or more of the Option-Kind field, the Option-Length field, and the Option-Date field); TCP Explicit Congestion Notification information; and so forth. In an embodiment involving Internet Protocol (IP), the packet header options include, for example, but are not limited to, the following: at least one IP address (e.g., a source address and/or a destination address); an IP hop count; an IP Time To Live (TTL); an IP Type of Service (aka Differentiated Services Code Point (DSCP); IP Explicit Congestion Notification information, and so forth. In an embodiment involving media access control (MAC), the packet header options include, for example, but are not limited to, the following: a MAC address, a virtual local area network tag, and so forth.

In an embodiment, the packet header information that is preserved without translation includes all information specified in all 10 mandatory fields of the TCP header. In an embodiment, the packet header information that is preserved without translation further includes all information specified in at least all mandatory options fields of the header.

We note that TCP protocol operations and, hence, the operation of the PEP 130/230, can be described as involving a connection setup phase, a data transfer phase, and a connection termination phase. Connections between the source and the PEP and between the PEP and the destination are established in the multi-step handshake method 500 shown in FIG. 5 and pertaining to the connection setup phase that precedes entering the data transfer phase. After the completion of data transmission during the data transfer phase, the connection termination phase closes the aforementioned connections and releases all allocated resources therefor.

The hybrid approach embodied in Split-Snoop behaves like Snoop TCP for the connection setup phase (aka connection establishment phase). Hence, Split-Snoop preserves TCP connection semantics during the connection setup phase. Thus, for example, Split-Snoop waits for a Synchronize Acknowledge (SYN-ACK) to return from the destination device and prevents termination of a connection between the source device and the destination device until both the source device and the destination device have completed their respective connection establishment sequences (i.e., SYN, SYN-ACK, ACK, for full duplex communication between the source device and the destination device).

Further, the hybrid approach embodied in Split-Snoop behaves like Split TCP for the connection termination phase. Hence, Split-Snoop also preserves TCP connection semantics during the connection termination phase. That is, after the completion of data transmission during the data transfer phase, the connection termination phase closes the connection between the source device and the proxy and the connection between the proxy and the destination device, and releases all allocated resources therefor.

Also, the hybrid approach embodied in Split-Snoop behaves like Split TCP for the data transfer phase. Thus, Split-Snoop runs a transmission control protocol by masquerading as the source device to the destination device and masquerading as the destination device to the source device during the data transfer phase. As a result of such masquerading, Split-Snoop allows the congestion window of the sender to grow more quickly due to lower roundtrip time. That is, Split-Snoop increases a growth rate of a congestion window size of the source device due to lower roundtrip times. The lower roundtrip time is due to the PEP being closer to the destination device than the source device. Thus, in an embodiment, Split-Snoop can achieve the same performance improvements available for Split TCP.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for operating a transparent performance enhancing proxy between a source device and a destination device, comprising:
    preserving, without translation, packet header information of a header for a packet received from the source device to be forwarded to the destination device;
    during a transmission control protocol connection setup phase for the packet, preserving transmission control protocol connection semantics;
    upon establishment of a connection between the source device and the destination device during the transmission control protocol connection setup phase, locally terminating the connection at the transparent performance enhancing proxy and creating a connection from the source device to the transparent performance enhancing proxy and a connection from the transparent performance enhancing proxy to the source device; and
    during a transmission control protocol data transfer phase for the packet, running a transmission control protocol by masquerading as the source device to the destination device and masquerading as the destination device to the source device to transmit the packet to the destination device with the preserved packet header information.

2. The method of claim 1, wherein the packet header information that is preserved without translation comprises, at least one of:
    for transmission control protocol communication of the packet, at least one of a transmission control protocol port number, a transmission control protocol sequence number, and a transmission control protocol header option;
    for Internet protocol communication of the packet, at least one of an Internet Protocol address, an Internet Protocol hop limit, an Internet Protocol Time To Live, an Internet Protocol Type of Service, and an Explicit Congestion Notification; and
    for media access control communication of the packet, at least one of a media access control address and a virtual local area network tag.

3. The method of claim 1, wherein the packet header information that is preserved without translation comprises all information specified in all mandatory fields of the header.

4. The method of claim 3, wherein the packet header information that is preserved without translation further comprises all information specified in at least some mandatory options fields of the header.

5. The method of claim 1, wherein the transmission control protocol connection semantics are preserved for the connection setup phase by waiting for a Synchronize Acknowledge to return from the destination device and preventing termination of a connection between the source device and the destination device until both the source device and the destination device have completed their respective connection establishment sequences for the connection.

6. The method of claim 1, further comprising preserving transmission control protocol connection semantics for a connection termination phase for the packet by closing a connection between the source device and the transparent performance enhancing proxy, closing a connection between the transparent performance enhancing proxy and the destination device, and releasing all allocated resources for the connections.

7. The method of claim 1, further comprising:
    responsive to receiving the packet from the source device, creating a copy of the packet, caching the copy of the packet, and transmitting the copy of the packet to the destination device;
    responsive to receiving an acknowledgement for the packet from the source device, destroying the copy of the packet that has been cached; and
    responsive to a detection of packet loss relating to the packet, retransmitting the copy of the packet that has been cached.

8. The method of claim 1, further comprising preserving, for the connection from the source device to the transparent performance enhancing proxy and the connection from the transparent performance enhancing proxy to the source device, any transmission control protocol options previously negotiated between the source device and the destination device for the connection there between.

9. The method of claim 8, wherein the transmission control protocol options comprise at least one of path Maximum Transmission Unit, Selective Acknowledgement, and Explicit Congestion Notification.

10. A computer program product for operating a transparent performance enhancing proxy, the computer program product comprising a non-transitory computer readable storage medium having program instructions embodied therewith, the program instructions executable by a processor comprised in the transparent performance enhancing proxy to cause the transparent performance enhancing proxy to:
    preserve, without translation, packet header information of a header for a packet received from the source device to be forwarded to the destination device;
    during a transmission control protocol connection setup phase for the packet, preserve transmission control protocol connection semantics;

upon establishment of a connection between the source device and the destination device during the transmission control protocol connection setup phase, locally terminating the connection at the transparent performance enhancing proxy and creating a connection from the source device to the transparent performance enhancing proxy and a connection from the transparent performance enhancing proxy to the source device; and during a transmission control protocol data transfer phase for the packet, running a transmission control protocol by masquerading as the source device to the destination device and masquerading as the destination device to the source device to transmit the packet to the destination device with the preserved packet header information.

11. The computer program product of claim 10, wherein the packet header information that is preserved without translation comprises, at least one of:

for transmission control protocol communication of the packet, at least one of a transmission control protocol port number, a transmission control protocol sequence number, and a transmission control protocol header option;

for Internet protocol communication of the packet, at least one of an Internet Protocol address, an Internet Protocol hop limit, an Internet Protocol Time To Live, an Internet Protocol Type of Service, and an Explicit Congestion Notification; and for media access control communication of the packet, at least one of a media access control address and a virtual local area network tag.

12. The computer program product of claim 10, wherein the transmission control protocol connection semantics are preserved for the connection setup phase by waiting for a Synchronize Acknowledge to return from the destination device and preventing termination of a connection between the source device and the destination device until both the source device and the destination device have completed their respective connection establishment sequences for the connection.

13. The computer program product of claim 10, further comprising preserving transmission control protocol connection semantics for a connection termination phase for the packet by closing a connection between the source device and the transparent performance enhancing proxy, closing a connection between the transparent performance enhancing proxy and the destination device, and releasing all allocated resources for the connections.

14. The computer program product of claim 10, further comprising preserving, for the connection from the source device to the proxy and the connection from the proxy to source device, any transmission control protocol options previously negotiated between the source device and the destination device for the connection there between.

15. A transparent performance enhancing proxy for disposing between a source device and a destination device, the proxy comprising:

a processor for preserving, without translation, packet header information of a header for a packet received from the source device to be forwarded to the destination device; and a memory for storing a copy of the packet, wherein during a transmission control protocol connection setup phase for the packet, the processor preserves transmission control protocol connection semantics, wherein the processor, upon establishment of a connection between the source device and the destination device during the transmission control protocol connection setup phase, locally terminates the connection at the transparent performance enhancing proxy and creates a connection from the source device to the transparent performance enhancing proxy and a connection from the transparent performance enhancing proxy to source device, wherein during a transmission control protocol data transfer phase for the packet, the processor running a transmission control protocol by masquerading as the source device to the destination device and masquerading as the destination device to the source device to transmit the packet to the destination device with the preserved packet header information.

16. The transparent performance enhancing proxy of claim 15, wherein the transmission control protocol connection semantics are preserved for the connection setup phase by waiting for a Synchronize Acknowledge to return from the destination device and preventing termination of a connection between the source device and the destination device until both the source device and the destination device have completed their respective connection establishment sequences for the connection there between.

17. The transparent performance enhancing proxy of claim 15, wherein the processor preserves, for the connection between the source device and the transparent performance enhancing proxy and the connection between the transparent performance enhancing proxy and the source device, any transmission control protocol options previously negotiated between the source device and the destination device for the connection there between.

* * * * *